US006327342B1

United States Patent
Mobley et al.

(10) Patent No.: US 6,327,342 B1
(45) Date of Patent: Dec. 4, 2001

(54) E911 BACKUP SYSTEM FOR EMERGENCY 911 CALL ANSWERING SYSTEMS

(76) Inventors: Matthew Stephen Mobley, 3436 Roanoke Rd., LaGrange; Simon J. G. Machell, 38 Timberlost Trail, Suwanee, both of GA (US) 30024

( * ) Notice: Subject to any disclaimer, the term of this patent is extended or adjusted under 35 U.S.C. 154(b) by 0 days.

(21) Appl. No.: 09/579,742

(22) Filed: May 26, 2000

Related U.S. Application Data
(60) Provisional application No. 60/136,424, filed on May 28, 1999.

(51) Int. Cl.[7] .................................................. H04M 11/04
(52) U.S. Cl. .................................. 379/45; 379/47; 379/37
(58) Field of Search ................................... 379/45, 46, 47, 379/48, 49, 37, 38, 39, 40, 41, 42, 43, 44, 265, 266

(56) References Cited

U.S. PATENT DOCUMENTS

| | | |
|---|---|---|
| 4,192,973 | 3/1980 | Wiliams et al. . |
| 4,310,726 | 1/1982 | Asmuth . |
| 4,924,491 | 5/1990 | Compton et al. . |
| 5,249,223 | 9/1993 | Vanacore . |
| 5,323,444 | 6/1994 | Ertz et al. . |
| 5,345,583 | 9/1994 | Davis . |
| 5,379,337 | 1/1995 | Castillo et al. . |
| 5,404,350 | 4/1995 | DeVito et al. . |
| 5,454,025 | 9/1995 | Mulrow et al. . |
| 5,579,368 | * 11/1996 | Van Berkum ........................ 379/15 |
| 5,646,987 | 7/1997 | Gerber et al. . |
| 5,661,779 | 8/1997 | Lee . |
| 5,734,698 | 3/1998 | Kobayashi et al. . |
| 5,841,848 | 11/1998 | Dunn . |
| 5,844,974 | 12/1998 | Ichikawa . |
| 6,252,943 | * 6/2001 | Johnson et al. ........................ 379/45 |

* cited by examiner

Primary Examiner—Stella Woo
Assistant Examiner—Melur Ramakrishnaiah
(74) Attorney, Agent, or Firm—Kilpatrick Stockton

(57) ABSTRACT

The present invention is an E911 backup system that bridges and monitors standard analog E911 trunks in an emergency 911 answering system ("E911"), also know as a public safety answering position (PSAP) equipment. The E911 backup system has the ability to take control of these trunks in the event of primary PSAP equipment failure. This is accomplished by monitoring and selectively acting upon a series of alarm signals. The alarm signals include: a watch-dog signal from the E911 call answering system; a batter monitor to detect the presence of a voltage on the E911 analog trunk; a wink watch signal to monitor whether the primary systems transmits a wink signal; and an answer alarm signal that detects the E911 call answering systems failure to answer an incoming call within a specified period of time. Upon detecting one or more of the selected alarm signals, an E911 backup system assumes control of the E911 trunk, passing any new or in progress calls to a standard telephone handset by operating the phone's ringer and patching the call through to the telephone when answered.

30 Claims, 9 Drawing Sheets

E911 BACKUP SYSTEM FOR EMERGENCY 911 CALL ANSWERING SYSTEMS

CROSS REFERENCE TO RELATED APPLICATIONS

This application claims priority to provisional patent application Ser. No. 60/136,424 filed May 28, 1999.

TECHNICAL FIELD

This invention relates generally to an emergency 911 call answering systems, and more particularly relates to a computer-based system that monitors the operation of an emergency 911 call answering system and switches any in-progress or incoming calls to alternative answering devices.

BACKGROUND OF THE INVENTION

Many communities operate emergency 911 call answering systems, also called "E911 call answering systems" or public safety answering position (PSAP) equipment. These systems are typically computer-controlled telephone switching systems that receive 911 calls at a central emergency services dispatching center and connect the calls to emergency services dispatchers via the E911 trunk lines. The E911 calls are routed to the dispatching center by telephone company central offices, and are answered by dispatchers who determine the caller's physical location by computer assistance, ascertain the type and severity of the caller's needs, and dispatch appropriate emergency services.

The computer system is typically used to receive automatic number identification ("ANI," also known as "caller ID" information) from the telephone call, use the caller ID to index a computer database to determine the calling party's location (address), and display the calling party's location on a graphical display. These computer-assisted operations facilitate the assignment of an appropriate emergency service vehicle and personnel.

Many of these E911 call-answering systems operate under control of a multi-threaded multi-tasking operating system (MTOS). However, these MTOSs have a known propensity to fail or "lock up" under unknown conditions. If the failure occurs during the handling of an emergency call, the dispatcher can lose communication with the distressed calling party, who may be in a life-threatening situation. It goes without saying that such a failure is extremely undesirable. Although the computer-based emergency 911 system can usually be rebooted, valuable time has been lost. Even if the situation is not life threatening and the calling party calls back, the failure of the system is disruptive.

Accordingly, there is a need for a system to detect the possible failure of a computer-operated E911 call answering system. There is a further need in the art for a system that can keep emergency 911 calls from being dropped during a failure of the underlying computer system of the emergency 911 call answering system.

SUMMARY OF THE INVENTION

The present invention meets the above-described need by providing an E911 backup system that bridges and monitors standard analog E911 trunks in an emergency 911 call answering system ("E911 call answering system"), also known as public safety answering position (PSAP) equipment. The E911 backup system takes control of the E911 trunks in the event of primary PSAP equipment failure. This is accomplished by monitoring and selectively acting upon a series of alarm signals. Upon detecting one or more of the alarm signals, the E911 backup systems takes over every E911 trunk line, passing any new or in progress calls to a standard telephone handset by activating the standard telephone's ringer and patching the call through to the phone when answered.

Once the E911 backup system ceases to detect an alarm signal, control of the E911 trunk lines are restored to the E911 call answering system. The control of the E911 trunks will not, however, pass back to the E911 call answering system if a call is in progress. Control of the E911 trunks will pass over to the E911 call answering system only when no alarm signals are detected and no calls are present on the E911 trunks.

While the E911 backup system is active, incoming automatic number identification (ANI) information will be displayed on an alphanumeric display. Also, the E911 backup system will print call log information to an attached printer. This log information consists of trunk seizure time, answer time, and call termination time, the party that terminated the call and ANI information if available.

When a call comes in to an E911 call answering system, the originating equipment (CO or Tandem) will draw line current from the trunk. When the E911 equipment senses this, it acknowledges by sending a momentary battery reversal (wink) to the originating equipment. After the wink, the originating equipment will send the ANI information using multi-frequency (MF) signaling. After the ANI information is received, the call can be answered.

Generally described, the E911 backup system bridges and monitors an E911 call answering system that is connected to a series of standard analog E911 trunk lines. The E911 backup system includes a control unit that continually monitors a series of alarm signals generated by the E911 call answering system. If the switching unit detects one or more alarms signals, the control unit transmits a control signal to disable the E911 call answering system and the causes any new or in-progress calls carried by the 911 trunk lines to a be routed to a number of standard telephone handsets. Inputs to the E911 backup system, which include the alarm signal, the power supply and the E911 trunks enter the E911 backup system through a single input port. The outputs of the E911 backup system, which include the E911 trunks are output through an output port, such as a standard RJ-11 telephone jack, to a series of standard telephone handsets.

The E911 backup system also includes a display unit displaying information regarding the status of the control unit and the E911 trunks. For example, incoming calls on the E 911 trunk typically contain an ANI, or caller ID information. The display unit can display the ANI of the incoming call, thereby allowing an operator to determine the calling party's telephone number in the event of an E911 call answering system failure. Although, the operator may not be able to immediately determine the location of the calling party, the operator may be able to use the calling party's phone number to manually search a database to determine the caller's location. The display unit can also display status messages of any diagnostic test that the E911 backup system performs or the operational status of the E911 call answering system. This allows the operators of an E911 call answering system to quickly determine whether there is a problem with the E911 backup system or the E911 call answering system by simply checking the display unit.

The display unit also contains a series of light emitting diodes (LEDs) to further indicate the status of the E911 backup systems. Each E911 trunk connected to the E911 backup systems has a pair of LEDs associated with it to indicate whether it is in use when the incoming calls have been routed to the E911 backup system. For example, one LED will be on when the E911 trunk is idle, or when there is no incoming call on the line. Similarly, the other LED will be on when the E911 trunk is active, or contains an incoming call. Therefore, using both an alphanumeric display and a series of LED pairs, an operator is able to assess the status of both the E911 backup system and the E911 trunks quickly and easily. The E911 backup system also contains a data bus, which carries both the data and control signals between the control unit, the switching unit and the display unit.

More specifically described, the invention is directed towards the E911 backup system for an E911 call answering system in which the control unit includes a central processing unit (CPU) and several memory storage devices to control the operation of the backup unit. A first memory storage device, such as an erasable programmable read-only memory (EPROM), may store a computer application program to initialize the E911 backup system. Each time the E911 backup system is turned on the initialization computer program is loaded into the CPU via the data bus and activates or "boots up" the E911 backup systems. In addition to initializing the E911 backup system, the initialization code also performs a series of diagnostic test to ensure that the E911 backup system is operating properly. Finally, after the diagnostic tests are completed, the initialization code instructs the CPU to retrieve an E911 application program from a second memory storage device, such as a flash random access memory (FRAM) and loads it into the CPU via the data bus.

Once the E911 application program is loaded, the E911 application program may operate in one of several modes. The operator through a switching circuit containing several switches connected to the control unit selects the mode of operation. Each switch is associated with one of the operating modes. Setting one of the switches causes the E911 application program to run in the corresponding operating mode. The modes of operation in which the E911 application program may operate in include a diagnostics mode in which a series of diagnostic tests are enabled. The application program may also operate in a random access memory update/backup disable mode in which the operation of the E911 backup system is suspended while a new program is downloaded through a serial port. The application may also operate in a take over on battery loss mode, in which the E911 backup system assumes control of the E911 trunks in the event that a battery loss occurs on anyone of the E911 trunks. Another mode in which the application program may operate in is a take over on no wink/no answer mode. In this mode, the E911 backup system seizes control of the E911 trunks when the E911 call answering systems fails to generate a wink signal or fails to answer an incoming call. Yet another mode in which the E911 application program may operate in is a take over on watchdog signal mode. While operating in this mode, the E911 backup system assumes command of the E911 trunks if the E911 backup system fails to detect a watchdog signal from the E911 call answering system. Still another mode in which the E911 applications program may operate in an unconditional take-over mode. When this mode is enabled, the incoming calls and in-progress calls are immediately routed to the E911 backup system, regardless of whether any alarm signal has been detected. Finally, the E911 application program may operate in a 20 digit ANI display mode. When the E911 application program is operating in this mode, the alphanumeric display will display a 20 digit ANI message, rather than a standard 10 digit ANI message.

The control unit also contains a third memory storage device. However, unlike the first two memory storage devices that are used in the start-up and operation of the E911 backup system, the third memory storage device is used to store information received over the E911 trunks. For example, the third memory storage device, which is typically a RAM memory, stores the ANI, and time stamp information for each call to ensure that no data is lost when control of the E911 trunks reverts back to the E911 call answering system or in the event that a call is inadvertently disconnected from the E911 backup system.

The invention also contains a number of E911 interface circuits. Each E911 interface circuit is associated with at least one of the E911 trunk lines and are capable of routing any incoming calls from the E911 call answering systems to the E911 backup system.

The invention also contains a number of plain old telephone sets (POTS) interfaces that connect the E911 backup system to a number of standard telephone handsets. The POTS interfaces receive the incoming calls from the E911 interface circuit and routes the incoming call to a standard telephone handset. The POTS interfaces also mix a ring tone with the incoming calls to alert the E911 operators which handset the call is being routed to.

The invention further includes a multi-frequency (MF) decoder connected to each of the E911 interface circuits. The MF decoder captures the ANI information associated with the incoming call received on one of the E911 trunk lines. The ANI information is then routed to the display device. Alternatively, the E911 interface circuits may share a single MF decoder for capturing ANI information. In yet another alternative, a number of MF decoders can be used such that each MF decoder is connected to an even multiple of the number of E911 interface circuits.

The invention also includes several opto-isolators. The opto-isolators monitor the trunk lines to detect the presence of a wink signal. If a wink signal is not detected within a specified time, on any of the E911 trunks, the optoisolator sends a signal to the control unit. The control unit, in turn, generates a control signal that causes the E911 backup system to assume command of the E911 trunks.

The invention also includes an audible tone generator. The audible tone generator generates an audible signal that is played back over the analog E911 trunk when the E911 trunk is active. The audible tone may be used to provide the ring tone back to a calling party when a calling party dials the E911 answering center. Additionally, the audible tone may also be used to create a notification signal to the central office when the central offices generates a test call to the E911 backup system to ensure that the E911 backup system is on-line and operational.

Finally, the invention may provide for a method of backing up an E911 call answering system, in which an E911 backup system bridges the E911 trunk lines. The first step of the method is to monitor a series of alarm signals between the E911 backup system and the E911 call answering system. When at least one alarm signal is detected, the next step is to transmit a control signal from the E911 backup system to the E911 call answering system to disable the 911 call answering system. Next, the E911 trunk lines are routed from E911 call answering system to the E911 backup system and then to a standard telephone handset where a 911 operator can answer any incoming calls.

That the invention improves over the drawbacks of prior E911 backup methods and accomplishes the advantages described above will become apparent from the following detailed description of the exemplary embodiments and the appended drawings and claims.

DETAILED DESCRIPTION OF THE EMBODIMENTS

Figure 1:
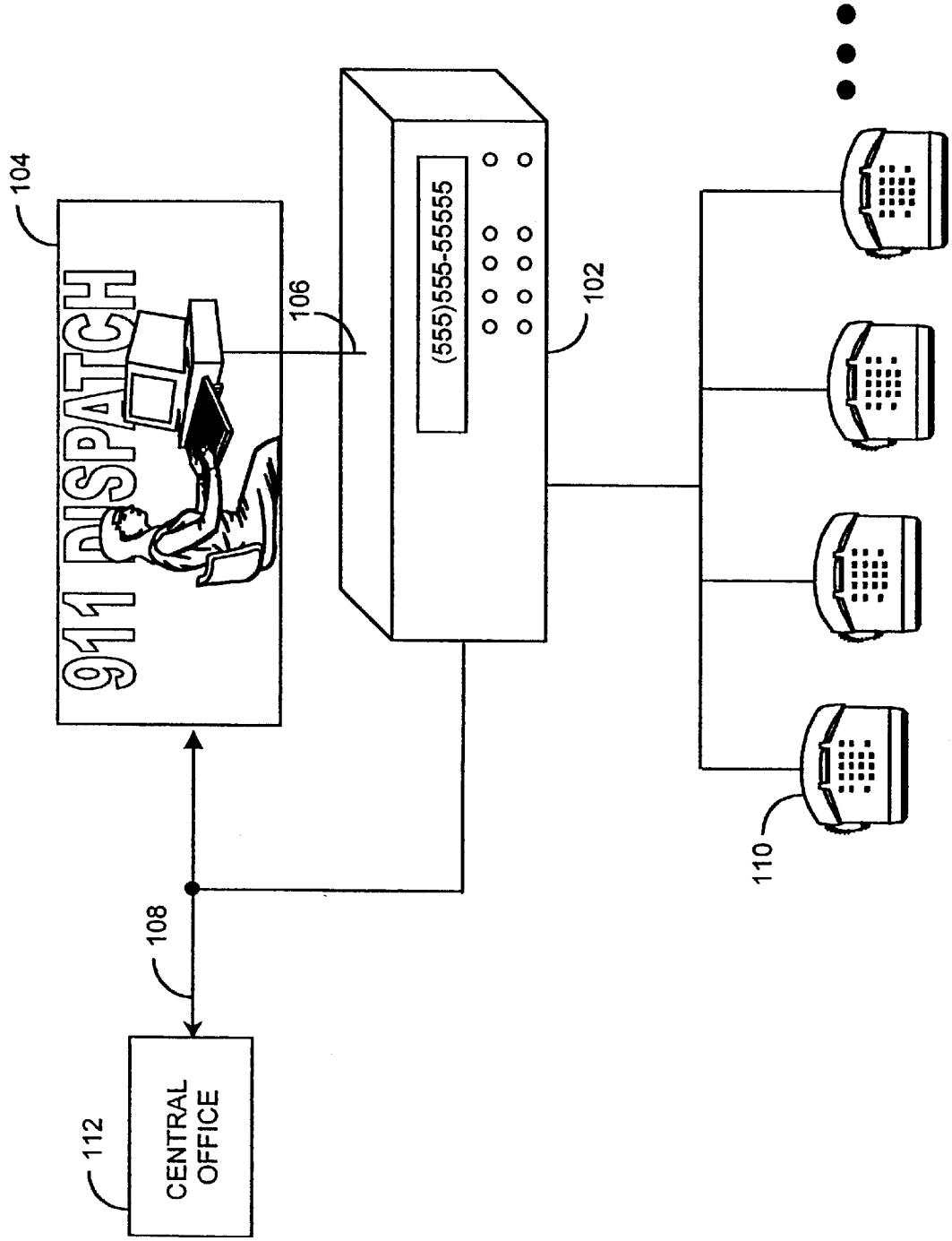
FIG. 1 is an illustration of the general architecture of a system constructed in accordance with the present invention.

The present invention is an E911 backup system that bridges and monitors standard analog E911 trunks in an emergency 911 answering system ("E911"), also know as a public safety answering position (PSAP) equipment. The E911 backup system has the ability to take control of these trunks in the event of primary PSAP equipment failure. This is accomplished by monitoring and selectively acting upon a series of alarm signals. The alarm signals include: a watchdog signal from the E911 call answering system; a battery monitor to detect the presence of a voltage on the E911 analog trunk; a wink watch signal to monitor whether the primary systems transmits a wink signal; and an answer alarm signal that detects the E911 call answering systems failure to answer an incoming call within a specified period of time. Upon detecting one or more of the selected alarm signals, an E911 backup system assumes control of the E911 trunk, passing any new or in progress calls to a standard telephone handset by operating the phone's ringer and patching the call through to the telephone when answered.

While the E911 backup system is active, incoming automatic number identification (ANI) information associated with the incoming calls will be displayed on an alphanumeric display. Also, the E911 backup system prints call log information to an attached printer. This log information consists of the trunk seizure time, the answer time, the call termination time, the identification of which party terminated the call, and ANI information, if available.

Input connections to the E911 backup system include the analog E911 trunks, watchdog inputs, and DIP switches for option selection. Outputs from the E911 backup system comprises analog POTS trunks (when active), a watchdog output for alarm indication, and a signal line that indicates when the E911 backup system is handling calls.

When a call comes in to an E911 call answering system or PSAP equipment, the originating equipment (CO or Tandem) will draw line current from the trunk. When the PSAP equipment senses this, it acknowledges by sending a momentary battery reversal (wink) to the originating equipment. After the wink, the originating equipment will send the ANI information using multi-frequency (MF) signaling. After the ANI information is received, the call can be answered.

When the E911 backup system takes over the E911 trunks, it will provide all the necessary call supervision to the E911 trunks. It will also provide a control signal indicating that it is controlling the call, which can be used to operate an alarm and/or to operate a change over relay to take the E911 call answering system off-line. The E911 backup system monitors the progress of all calls and, if any calls were in progress, the takeover is fast enough to prevent them from being dropped. In-progress calls or new calls will cause an attached phone to ring so the call can be handled. Incoming calls will display the associated ANI information on the LCD display. Typically, the incoming ANI information can be 8, 10 or 20 characters in length. The LCD display, which is capable of only displaying 10 characters at a given time will be unable to display the 20-character ANI information. For these circumstances, a DIP switch controls how the 20 digit ANI is displayed. For example, when the DIP switch is in a first position, the first 10 characters of the 20-character ANI information are displayed. When the DIP switch is in a second position, the second 10 characters of the ANI are displayed on the LCS display. Alternatively, the LCD display may be capable of scrolling the 20 character messages across LCD display so that the user may see the 20 character message. Furthermore, the LCD display may be capable of displaying all 20 characters of the ANI information at the same time. In this instance, the LCD is capable of displaying the entire 20 character ANI message. Although the display device has been described as and LCD display capable of displaying either 10 or 20 characters of the ANI information at a time, those skilled in the art will realize that other displays, such as an active matrix or analog screen may be used to display the ANI information without departing from the scope of the invention.

When the phone is answered, an internal connection is made between the E911 trunk and the line to the telephone to facilitate the call. While the E911 backup system is active, all call progress information is reported to an attached line printer, including the seizure time, the answer time, the drop time, the hangup time, and the ANI.

Exemplary embodiments of the invention are described below with reference to the appended figures. In this description, like elements are indicated by like element numbers throughout the several figures.

FIG. 1 illustrates how an E911 backup system 102 is connected to an E911 call answering system 104. A series of four (4) E911 trunk lines 108 connect a central office 112 to the E911 call answering system 104. The E911 backup system 102 bridges the trunk lines 108 and is in parallel with the E911 call answering system 104. A series of control lines 106 connect the E911 backup system 102 to the E911 call answering system 104 and are used to monitor a series of alarm signals associated with the E911 call answering system 104, such as a watchdog signal, a wink signal, and a battery loss signal. If the E911 backup system 102 detects the presence of any one of these alarm signals, the E911 backup system 102 becomes "active" and issues a command to the E911 call answering system 102 taking over the E911 trunk lines. While the system is active, all incoming calls and all in-progress calls are routed to the E911 backup system 102. The E911 backup system 102, extracts any automatic number identification (ANI) information associated with each call and displays it on a display device so that the operator manning the E911 call answering system can track the call. After the ANI information has been extracted, the E911 backup system routes the calls to a series of standard telephone handsets 110 where they can be answered by the E911 operator. Although the E911 backup system is described as typically having four E911 trunk lines attached to it, it should be obvious to those skilled in the art that any number of trunk lines may be attached to the E911 backup system without altering the nature of the invention.

Figure 2:
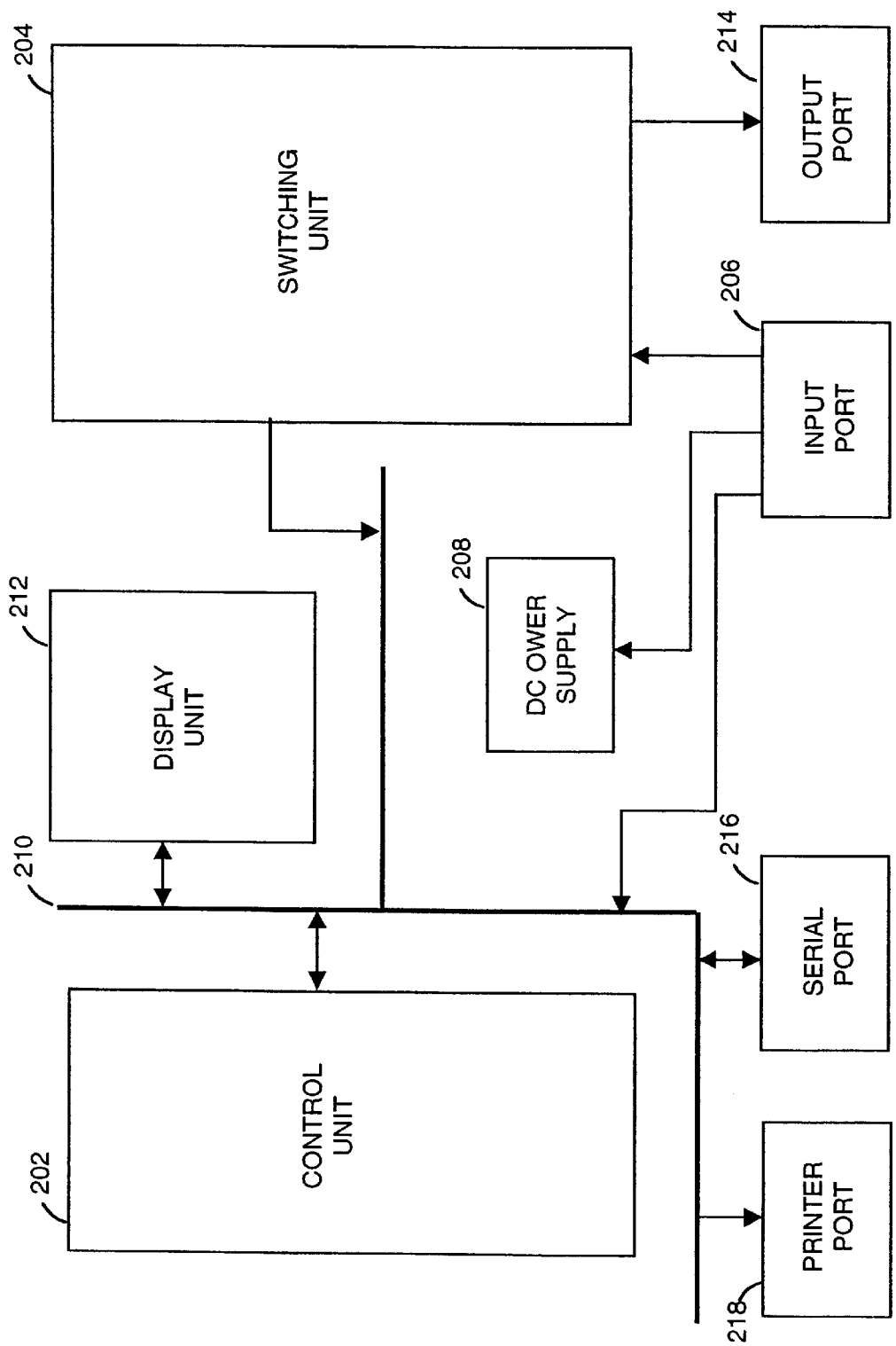
FIG. 2 is a functional block diagram of the E911 backup system for an E911 call answering system.

FIG. 2 is a functional block diagram of the E911 backup system 102. The E911 backup system comprises a control unit 202, a switching unit 204, an input port 206, a DC power supply 208, a bi-directional data bus 210, a display unit 212, an output port 214, a serial port 216, and a printer port 218. The E911 backup system 102 receives the alarm signals, the E911 trunk lines, and the power supply through the single input port 206. The input port 206 separates the individual signals and routes them to the appropriate unit. For example, the alarm signals are routed to the control unit 202 through the data bus 210. The input voltage is connected to the DC power supply 208, and the four E911 trunks 108 are directed to the switching unit 204. The control unit 202 continually monitors the alarm signals at regular time intervals to detect a presence of a positive alarm condition. Typically, the control unit samples the alarm signals at regular intervals to determine if the E911 call answering system 104 has gone down and transfer control of the E911 trunks 108 to the E911 backup system 102. Typically, the regular interval is 20 milliseconds. However, those skilled in the art will appreciate that other values less than 20 milliseconds may be used to sample the E911 trunks without departing from the scope of the invention. Normally, 20 milliseconds is the largest amount of allowable time to monitor the E911 trunks to insure that an in-progress call is not dropped from the system.

If the control unit 202 detects a positive alarm condition, a control signal is generated by the control unit 202 and sent via the data bus 210 to the output port 214 where it is sent back to the E911 call answering system 104. The control signal causes the E911 call answering system 104 to go "off-line" and allows the E911 backup system 102 to take command of the E911 trunk lines 108. Switching control of the E911 trunks 108 from the E911 call answering system 104 to the E911 backup system 102 should be fast enough to ensure that in-progress calls are not lost. Typically, the transfer of control from the E911 call answering system 104 to the E911 backup system 102 occurs within 250 milliseconds. This ensures that any incoming calls are not disconnected from the E911 104 system during the switch over to the E911 backup system 102.

The input voltage passes through the input port 206 and is connected to the DC power supply 208. Typically, the input voltage for the E911 backup system 104 is a −48 volt, which is the same as the power for the E911 call answering system 102. This is due to the fact that the E911 call answering system 104 acts as an exchange for incoming calls. That is, the E911 call answering system 104 supplies the line voltage that powers the audible ring back signals to the calling party. The E911 backup systems 102 places a −48 volt bias on the E911 trunk 108. Therefore, when a calling party accesses one of the E911 trunk lines 108, the E911 call answering system 104 detects the active line and generates an audible ring signal to the calling party's end. When the voltage switches from −48 volts to +48 volts, thereby signaling the originating equipment that the connection is established.

Because the line voltage is at an inappropriate level and polarity to power individual components of the E911 backup system, the DC power supply 208 converts the −48 volts supplied by the E911 trunks 108 to a series of internal voltages using standard switching power supply technology. Specifically, the DC power supply 208 generates +5 volts, ±12 volts and +48 volts for use within the E911 backup system 102. The +5 volts, ±12 volts levels are used to power the individual electrical components within the control unit 202, the switching unit 204, and the display unit 212.

The remaining inputs, the E911 trunk lines 108 are directed to a switching unit 204. When the E911 backup system 102 is idle or inactive, the switching unit 204 is also inactive. However, when the E911 backup system is active, the switching unit 204 receives all incoming calls over the E911 trunks 108 and routes each call to an output port 214. The switching unit 204 also is responsible for generating the ring-back signal and wink signal, which is a momentary reversal and re-reversal of the line voltage on the E911 trunk, for each incoming call. When a call is incoming to the E911 backup system 102, the control unit 202 transmits a control signal to the switching unit 204 to generate a wink signal on the trunk to acknowledge to the originating equipment that a connection has been established. Upon acknowledgment of the wink signal, the originating equipment transmits the ANI or caller ID data to the switching unit 204. Upon receiving the ANI data, the switching unit 204 transmits it to the control unit 202 via the data bus 210. The control unit 202 then reroutes the ANI data to the display unit 212 where the data is displayed on a display device. Typically, the display device is a backlight 2×40 LCD display. However, those skilled in the art will appreciate that numerous other display devices, such as a video screen, a flat panel display or a light board, may be used for the display device without altering the scope of the invention.

In addition to the LCD display, the display unit 212 also contains two groups of status light emitting diodes (LEDs). The first group contains two individual LEDs aligned vertically. The top LED, when light, indicates that power is applied to the E911 backup system 102. The bottom LED indicates the level of activity experienced by the E911 backup system 102. For example, when the E911 backup system is idle, the bottom LED has a low intensity and flashes at a very slow rate. When the E911 backup system is active, the brightness of the LED increases in intensity and flashes at a higher rate. The intensity of the brightness and the rate at which this LED flash are directly proportional to the activity of the E911 backup system 108.

The second group of LEDs is a pair for each E911 trunk 108, called the line LEDs, aligned vertically. The top LED will light when the voltage polarity of the E911 trunk is normal (i.e., −48 volts) indicating that the line is in use. The bottom LED will light when the voltage polarity is revered (i.e., +48 volts), such as during a wink or call answer signal.

The output port is typically a series of standard telephone jacks, such as the RJ-11 telephone jack, such that the number of telephone jacks equals the number of E911 trunks. The telephone jacks are in turn connected to the standard telephone handsets.

The E911 backup system also contains two portable computer (PC) compatible ports: a serial port 216 and a printer port 218. The serial port 216 is a DB-9S that is wired to be a PC compatible RS-232 serial port. The serial port 216 can be connected to a serial peripheral device, such as a printer or modem to transfer data to and from the control unit 202 via the data bus 210. Additionally, the serial port 216 can be used to connect the E911 backup system to a PC to upload various application programs to the control unit 202 to run the E911 backup system 102.

The printer port 218 is a PC compatible parallel printer port. The printer port 218 can be connected to a line printer to automatically log the E911 backup system's 102 activities. For example, on startup, the control unit 202 performs a variety of diagnostic tests to ensure that the E911 backup system is working properly. The control unit 202 can transmit the result of the diagnostic tests to the printer port 218 through the data bus 210, where the results are printed to the line printer.

As sometimes happens during an emergency call, the call may be prematurely terminated due to the distress party accidentally hanging-up the phone or becoming incapacitated. Without knowing where the emergency call originated, the E911 operators cannot provide assistance in these cases, which in some instances could be fatal. Therefore, while the E911 backup system 102 is active, various E911 information concerning each call can be directed to the printer port 218 and the line printer to create a permanent log history of vital information. Such information may include the ANI information, when available, the time the call was received, the time the call was terminated, and who terminated the call (the calling party or the E911 operator). Thus, in this way, a record is created to ensure that vital information regarding the emergency call is permanently maintained so that the E911 operators can try and identify the distressed party in the event that the call is prematurely terminated.

Figure 3:
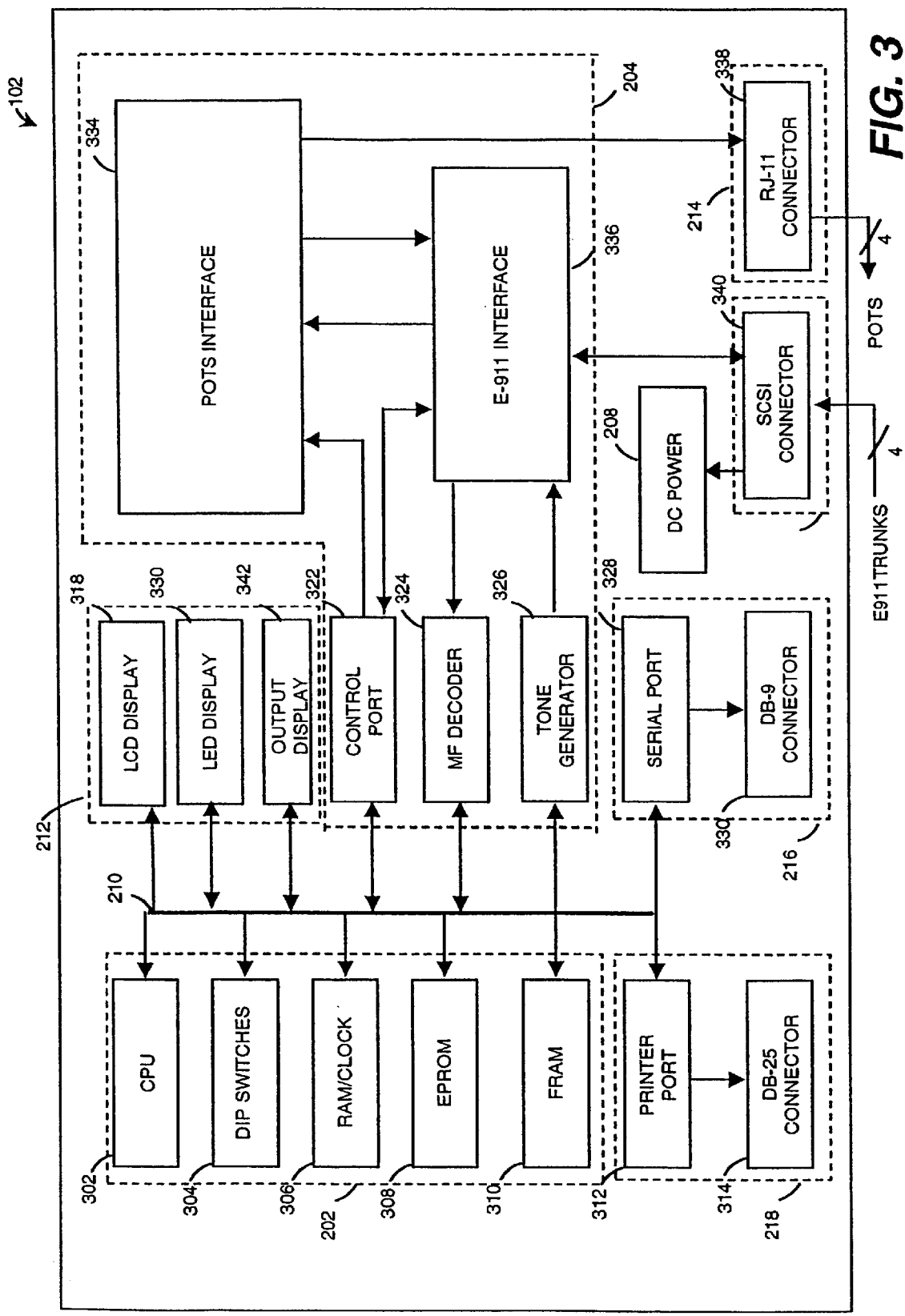
FIG. 3 is a block diagram of the E911 backup system.

FIG. 3 is a block diagram illustrating the individual hardware and interfaces contained with each functional unit (control unit 202, switching unit 204, an input port 206, a DC power supply 208, a data bus 210, a display unit 212, an output port 214, a serial port 216 and a parallel port 218) of the E911 backup system 102. The control port 202 contains a central processing unit 302, a set of DIP switches 304 a RAM-type memory 306, an EPROM-type memory 308, and a FRAM-type memory 310. The CPU 302 is preferably a model MC68HC11 manufactured by the Motorola Corporation of Schaumburg, Ill. Although the invention utilizes a MC68HC11 microprocessor for the CPU 302, it will be appreciated by those skilled in the art that other types of microprocessors can be substituted without altering the scope of the invention. The CPU 302 controls the operation of the E911 backup unit 202 and is connected to the other elements within the control unit 202 by the bidirectional data bus 210. Specifically, the CPU 302 is connected to an erasable programmable read-only memory (EPROM) device 306 which stores an initialization program code. The initialization code is loaded into the CPU 302 upon the unit being powered up. The initialization code initializes the E911 backup system 102 and performs a series of diagnostic test to ensure that the E911 backup system 102 is operating properly.

The CPU 302 is also connected to a flash random-access memory (FRAM) device 310 that stores the executable program code to operate the E911 backup system 102. Upon completion of the diagnostic tests, the initialization code loads the executable program code into the CPU 302. The CPU 302 is also connected to a random access memory (RAM) device 306 that is capable of storing data received during an emergency call, such the ANI or caller ID information the date and time of when the call occurred and the date and time when the call ended. The RAM storage device 306 also includes a clock circuit that produces a time stamp for all incoming emergency calls.

A series of DIP switches 304 are also connected to the CPU 302 and are used to select one of several operating modes. Typically there are eight operating modes that correspond to eight different DIP switches. The first DIP switch corresponds to a diagnostic mode. When this switch is enabled, a series of diagnostic tests are performed by the operating system on the E911 backup system 102. Normally, this switch should be set to the OFF position. It is typically only used by support personnel for servicing the system.

The second DIP switch configuration is the Update/Backup Disable mode. When this switch is selected, the unit will stop running after performing diagnostics tests and wait for a new operating program to be uploaded through the serial port. Additionally, after the system has fully powered up, this switch can be used to disable the E911 backup system 102.

The third DIP switch configuration is the Take Over on Battery Loss mode. When this switch is enabled, the E911 backup system 102 will take over command of the E911 trunks from the primary PSAP equipment when it detects a loss of line voltage on any one of the trunks.

The next DIP switch configuration is the Take Over on No Wink/No Answer mode. When this switch is selected, the E911 backup system 102 will seize the E911 trunks when the primary system does not generate a wink signal or answer a call.

Yet another DIP switch setting is the Take Over on Watchdog Signal. When this setting is selected, the E911 backup system 102 will seize the E911 trunks when it loses the watchdog signal from the primary E911 call answering system 104.

Still another DIP switch setting is an Unconditional Takeover. Whenever this switch is set, the E911 backup system 102 will immediately seize the E911 trunks regardless of whether the primary system is still operating. This gives the E911 operators complete control to override the system in instances when they know a system failure is imminent and vital emergency calls may be lost.

Finally, the last DIP switch setting is the 20 Digit ANI display. Typically, the ANI information is displayed in either 8 or 10 digit format by the display unit. However, there may be some instances when a 20 character ANI information will need to be displayed. Setting this DIP switch to a first position allows the first 10 characters of the 20 character ANI information to be displayed. If the DIP switch is set to a second position, the second 10 characters of the ANI information are displayed at the display device 212. This allows the E911 operators to have full control over the amount of information at their disposal to ensure they can adequately meet the needs of the calling party. The DIP switch settings are summarized in Table 1.

TABLE 1

Summary of DIP switch and settings and configurations.

| DIP Switch Setting | Configuration |
| --- | --- |
| 1 | Diagnostic Mode |
| 2 | FRAM Update/Backup Disable |
| 3 | Take-Over on Battery Loss |
| 4 | Take-Over on No Wink/No Answer |
| 5 | Take-Over on Watchdog Signal |
| 6 | N/A |
| 7 | Unconditional Take-Over |
| 8 | 20 Digit ANI Display |

The control unit 202 is connected to the input port 206 by the data bus 210. The input port 206 is preferably a dedicated 66 block with a 50 pin telco connector on the side. A SCSI-2 cable is used to connect the 66 block to the E911 backup unit 102. The SCSI-2-type connector receives inputs from up to four (4) E911 trunk lines 108, a series of alarm signals, and a line voltage to power the E911 backup system 102. A table detailing the pin connections is shown in Table 2.

TABLE 2

Pin connections for SCSI-2 input connector.

| PIN No. | NAME |
|---|---|
| 1 | |
| 2 | TIP 1 |
| 3 | |
| 4 | Input Relay A1 |
| 5 | |
| 6 | TIP 2 |
| 7 | |
| 8 | Input Relay A2 |
| 9 | |
| 10 | TIP 3 |
| 11 | |
| 12 | Input Relay A3 |
| 13 | |
| 14 | TIP 4 |
| 15 | |
| 16 | Input Relay A4 |
| 17 | |
| 18 | |
| 19 | Output Relay A1 |
| 20 | Output Relay A2 |
| 21 | Ground |
| 22 | Output Opto Isolator 1 |
| 23 | |
| 24 | Ground |
| 25 | Ground |
| 26 | |
| 27 | RING 1 |
| 28 | |
| 29 | Input Relay B1 |
| 30 | |
| 31 | RING 2 |
| 32 | |
| 33 | Input Relay B2 |
| 34 | |
| 35 | RING 3 |
| 36 | |
| 37 | Input Relay B2 |
| 38 | |
| 39 | RING 4 |
| 40 | |
| 41 | Input Relay B4 |
| 42 | |
| 43 | |
| 44 | Output Relay B1 |
| 45 | Output Relay B2 |
| 46 | Ground |
| 47 | Output Opto-Isolator 2 |
| 48 | |
| 49 | −48 Volts |
| 50 | −48 Volts |

The TIP and RING inputs are the inputs from the E911 trunks 108. The Input Relays contacts are the inputs for the alarm signals to the relay closure inputs and the Output relays contacts are the control signals connected to a series of redd relays to take the E911 call answering system 104 off-line in the event of a system malfunction. The Opto connections at pin number 22 and 47 are two wires that require the ground reference on the E911 backup system 102 to be connected to the ground reference of the originating PSAP equipment on the E911 call answering system 104. The backup system 102 requires −48 volts as the power source and is supplied by the line voltage on the E911 trunk. The −48 volts are connected to DC Power supply 208 that supplies power to the individual components in the E911 backup unit 102. The DC power supply uses standard switching power supply technology to generate +5 volt and ±12 volts internally needed to supply the individual components.

The E911 trunks 108 are connected to a switching circuit 204, which includes a series of an E911 interfaces 336, a series of plain old telephone sets (POTS) interfaces 334, a multi-frequency (MF) tone detector 326. Typically, there are four (4) E911 trunks connected to the E911 interface 336. Although the invention is described as receiving up to four E911 trunk lines 108, those skilled in the art will appreciate that any number of trunk lines may be added to the backup system without altering the operation or scope of the invention.

The E911 interface 336 is a solid state transformerless hybrid circuit capable of receiving the incoming calls from the E911 trunks. The E911 interface 336 receives a control signal from the control unit 202 via the control bus 210 indicating which incoming calls on the E911 trunks 108 should be passed through to a plain old telephone set (POTS) interface. The E911 interface 336 have an additional output to a multi-frequency (MF) decoder, which includes the ANI or caller ID information from the central office over the analog E911 trunk lines 108. The MF tone detector 326 passes the ANI information to the control unit, which in turn passes it to the display unit for display on a display device 212, preferably a backlight liquid crystal display (LCD) 318. Although the display device is described as being a LCD display, it will be appreciated by those skilled in the art that any display device, such as an analog monitor, a television set, of a digital monitor, may be substituted without altering the scope of the invention.

In addition to containing an LCD display 318, the display unit 212 also contains an light emitting diode (LED) display 330, which contains two groups of status LEDs. The first group has only two individual LEDs arranged preferably in a vertical configuration. The top LED indicates that power is applied to the backup system 102, while the bottom LED indicates the CPU's level of activity. For example, while the E911 backup system is idle, The bottom LED would flash slowly and very dimly. As the E911 backup system 102 became active and began receiving E911 calls, the bottom LED will flash faster and brighter, wherein the speed and intensity of which the LED flashes is directly proportional to the CPU activity. The second group of LEDs consists of a pair for each E911 trunk 108 to indicate the polarity of the line voltage while the E911 backup system 102 is active. For example, the top LED would be light when the line LED was normal or biased at −48 volts. The top LED, on the other hand, would be light when the polarity of the line voltage was reversed, such as during a wink or call answer.

The emergency calls are received from the input port 206 via the tip and ring signals. The incoming calls are then routed to a series of E911 POTS interfaces 334. The POTS interfaces 334 are a series of transformerless hybrid circuits, which route the incoming calls to a series of standard telephone handsets. The POTS interface 334 is connected to the tone generator 326, which generates 20 Hz ring signal used for producing the audible ring back to the calling party to let the them know that the call is in the process of being received.

The E911 backup system 102 also contains a parallel printer port 218 that consists of a printer port 312 and a connector, preferably a DB-25S connector that is configured as a PC compatible parallel printer port. ON power-up of the E911 backup system 102, the unit will log diagnostic and program messages to a line printer. Once the application program starts to run and the E911 backup system 104 becomes active, any E911 activity information is logged to the line printer. Typically, E911 activity information consists of the ANI information, when available, the trunk seizure time, the answer time, the call termination time, and who terminated the call.

The E911 backup system 102 also contains a serial port 328 that consists of a serial connector 330. Preferably the serial connector 330 is a DB-9S that is wired to be a PC compatible RS-232 serial port. The serial port 330 can be connected to a serial device, such as a printer or a modem to transfer data to and from the E911 backup system 102. For example, the serial port could be used to connect the E911 backup system to a separate personal computer to upload new versions of the operating software to the FRAM storage device 310. Additionally, the serial port could be used to connect the E911 backup system 102 to a personal computer to electronically control the configuration of the DIP switches 304 used to set the operating mode.

Figure 4:
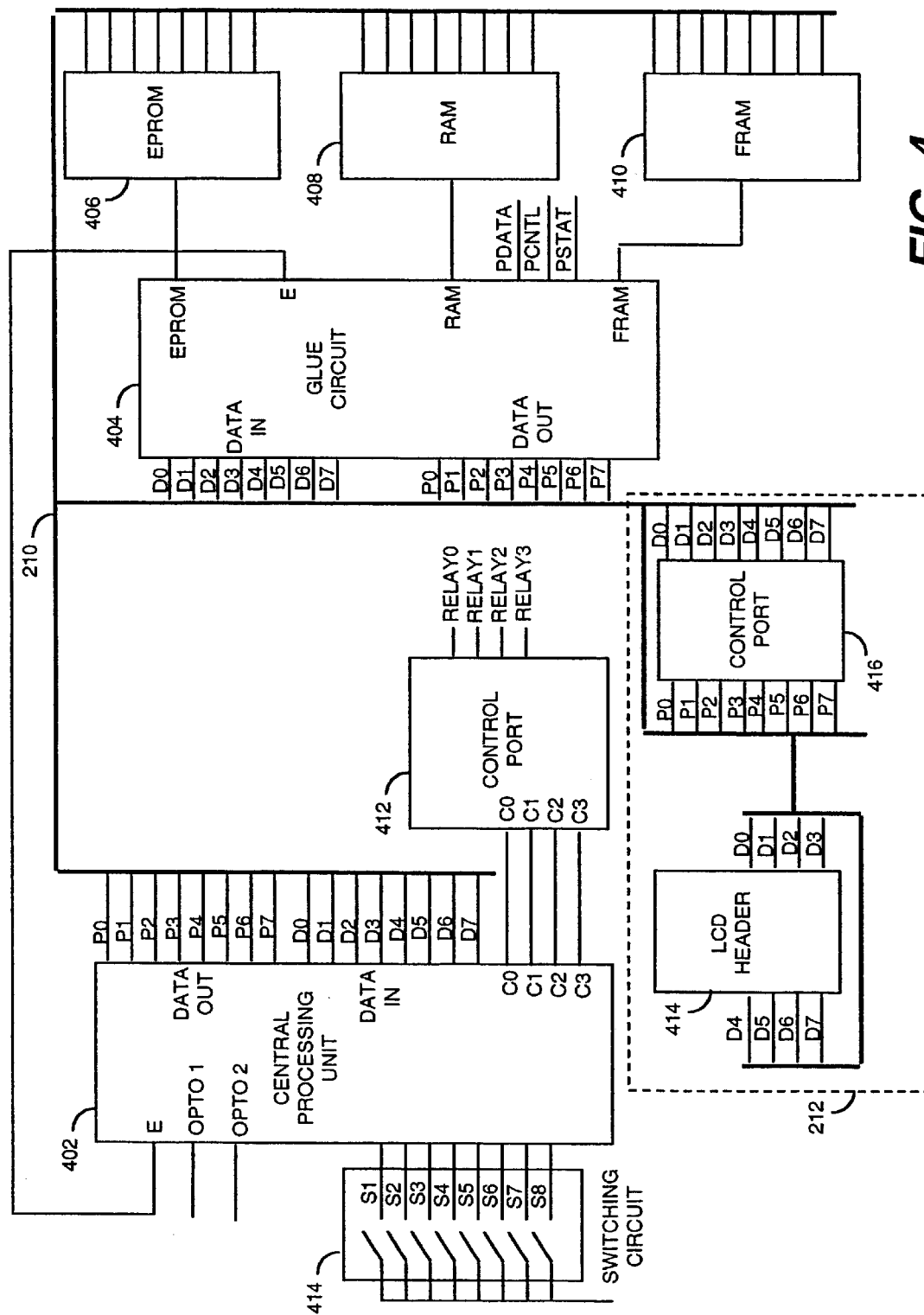
FIG. 4 is a block diagram of the control unit and display unit of the E911 backup system.

FIG. 4 is a general block diagram of the control unit 202. A switching circuit 414 consists of a series of DIP switches, which correspond to individual operating modes. The DIP switches are connected to the input ports of a central processing unit 402. The CPU 402 is connected to a field programmable gate array (FPGA) 404, preferably a model MAX 7064-LC84 manufactured by Altera Corporation of San Jose, Calif. Alternatively, the FPGA may be a programmable logic gate, such as an AND/OR gate. It will be appreciated by those skilled in the art that other types of FPGA that perform the equivalent function may be substituted for the FPGA utilized in the preferred embodiment without altering the scope of the invention. The FPGA 404 includes eight (8) data in ports and eight data out ports. Additionally, the FPGA 404 includes an EPROM port, a FRAM port and a RAM port.

Upon power up, the CPU 402 sends a signal to the FPGA 404 to cause the output of the EPROM port to be TTL low level. When the EPROM port is TTL low level, the EPROM memory device 406 is enabled and the initialization code is downloaded over 8 data lines to the CPU 402 through the data bus 210. Once the initialization code is downloaded to the CPU 402, it performs a series of diagnostic tests. The data signifying the results of the tests are transmitted over 8 data out ports, A0–A7, to a control port 416 for the LCD display header 414. The FPGA 404 then generates a control signal that is used to drive the LCD display header 414 to output the diagnostic information transmitted by the CPU 402.

Once the initialization code has finished running, the CPU 402 causes the control signal connected between the CPU 402 and the FPGA 404 to be a TTL low level. This causes the FRAM 410 to begin receiving the application program over the eight data lines D0–D7 of the data bus 210 to the CPU 402. Once the application program is running, an E911 operator can select a mode of operation by setting one of the eight DIP switches (SA1–S8) in the switching circuit 414.

While the E911 backup system 102 is active, the CPU 402 continually monitors the Opto-0 and Opto-1 input lines from the input port to determine if the E911 call answering system has lost power. If the CPU 402 detects that the E911 call answering system 104 lost power, the CPU sets the output ports C0–C3, to TTL high level. The output ports of the CPU 402 are connected to the input ports 1A, 2A, 3A, and 4A of the control port 412. The control port 412 generates the relay signals RELAY0–RELAY3 that control the operation of the relay circuits used to gate the E911 trunks to the switching unit 204. Therefore, when the output ports of the CPU 402 are TTL high level, the input ports to the control port 412 are also TTL high level. This will cause the four output ports of the control port 412, namely RELAY0, RELAY1, RELAY2, and RELAY3 to also be TTL high level. The TTL high level of the four RELAY ports will cause the each relay gating each E911 line to close and thereby seizing command of the four E911 trunks 108. The CPU 402 then sets the output port E, which is connected to the input port E1 on the FPGA 404 to TTL level high. In response, the FPGA 404 sets several chip selects PDATA, PSTAT, and PCNTL to TTL low level. These three output signal trigger the operation of the parallel printer port and set a pair or relay signal, SIG-RELAY1 and SIG-RELAY2 to TTL level high. These two relay switches are used to set a final pair of relays to disable the E911 ensure that the E911 backup system maintains control over the E911 trunks 108 while the E911 call answering system 104 is down.

Figure 5:
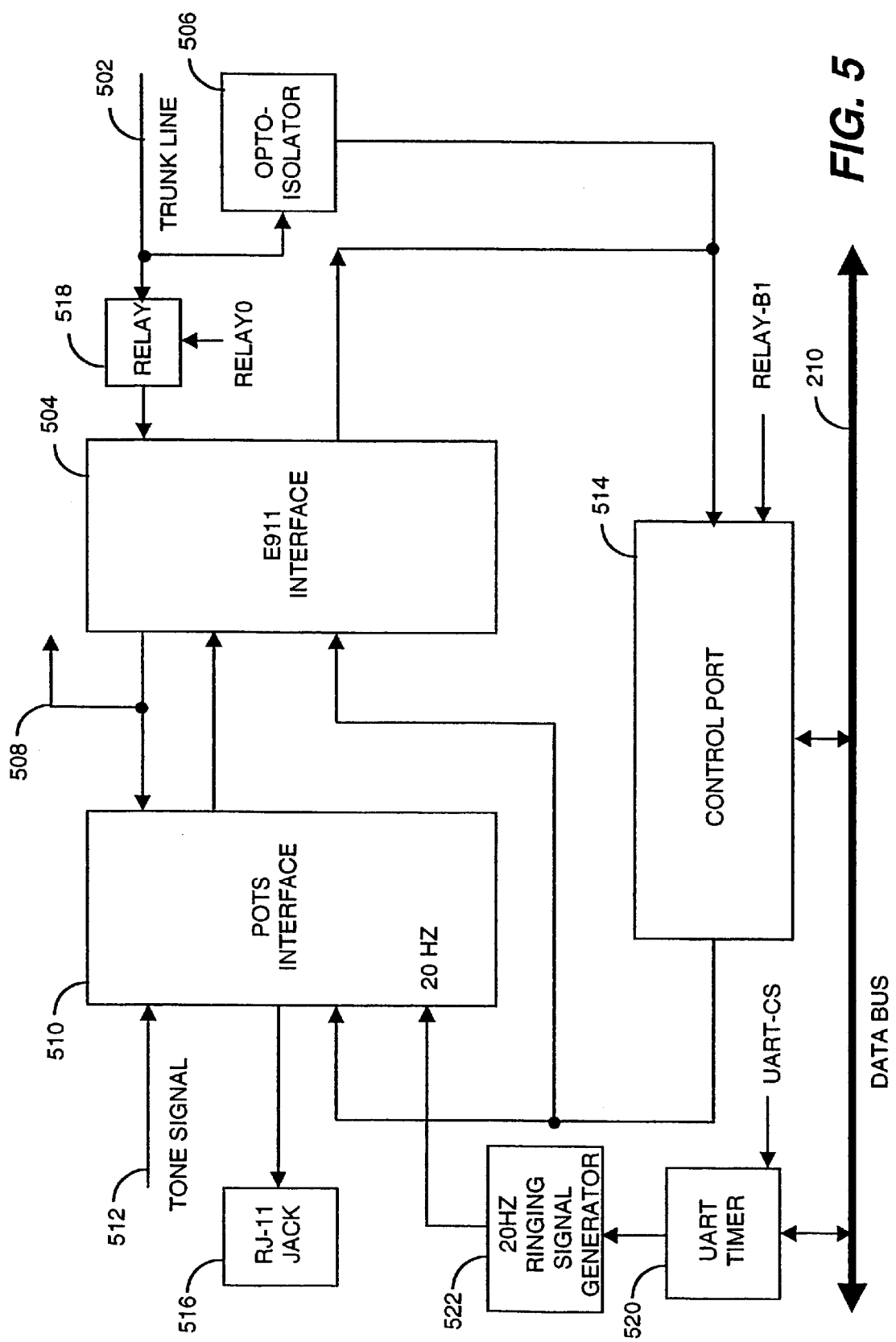
FIG. 5 is a block diagram of the switching unit of the E911 backup system.

FIG. 5 is general block diagram of the switching unit 204 for a single E911 trunk line 502. Each trunk line 502 connected to the E911 backup system 102 will have a corresponding switching unit 204. Therefore, the present invention will have four (4) separate witching units 204 connected to the four E911 trunk lines 502. For purposes of this application the discussion of the switching circuit 204 will be limited to a single trunk line. The trunk line 502 enters a relay switch 518, which is controlled by the input signal RELAY0 generated by the control unit 202 described in FIG. 4. As previously described, when an alarm signal is detected, the CPU 402 of the control unit 202 causes the relay signal levels to go high. When a relay signal level goes high, such as RELAY0, the relay 518 is closed and the trunk line 502 is connected to the E911 interface 504. The E911 interface 504 is an industry standard subscriber line interface chip (SLIC) model MH88625, commonly manufactured by the MITEL Corporation of Kanata, Ontario Canada. The E911 interface 504 transmits the audio signal from the trunk 502 to a plain old telephone set (POTS) interface 510. The POTS interface 510 converts the audio signal into a TIP and RING signals and which are connected to a standard RJ-11 telephone jack. The POTS interface 510 also contains a mixer circuit. The inputs to the mixer circuit are the transmitted audio signal from the POTS interface 510 and the tone signal 512 generated by the Tone Generator 326. The mixed signal is then applied to the RX port of the E911 interface 504. The E911 interface circuit transmits the mixed signal back over the TIP and RING lines of the E911 trunk.

An opto isolator 506 bridges the trunk line 502 prior to the relay switch 518. The opto isolator 506 monitors the polarity on the trunk line 502 for the presence of a battery voltage reversal, or wink signal. The opto isolator 506 has two outputs, a forward port and a reverse port. The forward port indicates when the line voltage is at its standard polarity. The reverse port indicates when the line voltage is at the reverse polarity. The reverse port and forward port are connected to an input reverse port and a forward port in the control unit 514, respectively. When a wink signal is detected by the opto-isolator 506, the control port 514 generates a control signal to the E911 interface 504 to disable the E911 trunks 502. The control port 514 also generates a control signal to activate the POTS interface 510 so that it will transfer any incoming calls to the standard telephone handsets 110 through the RJ-11 telephone jack 516. .

Each time the E911 trunk 502 receives an incoming call, a timing control signal, UART-CS goes to TTL level low. The UART-CS signal is connected to the control port of a UART timer 520. When the control port of the UART timer 520 is TTL level low, the UART timer 520 generates an input signal to a 20 Hz ringing signal generator 522. The input signal causes the 20 Hz ringing signal generator 522 to generate a 20 Hz tone, which is input directly to the POTS interface 510. The POTS interface 510 uses the 20 Hz tone to generate the handset ringing voltage at the standard telephone handset to alert the E911 operators of an incoming call.

Figure 6:
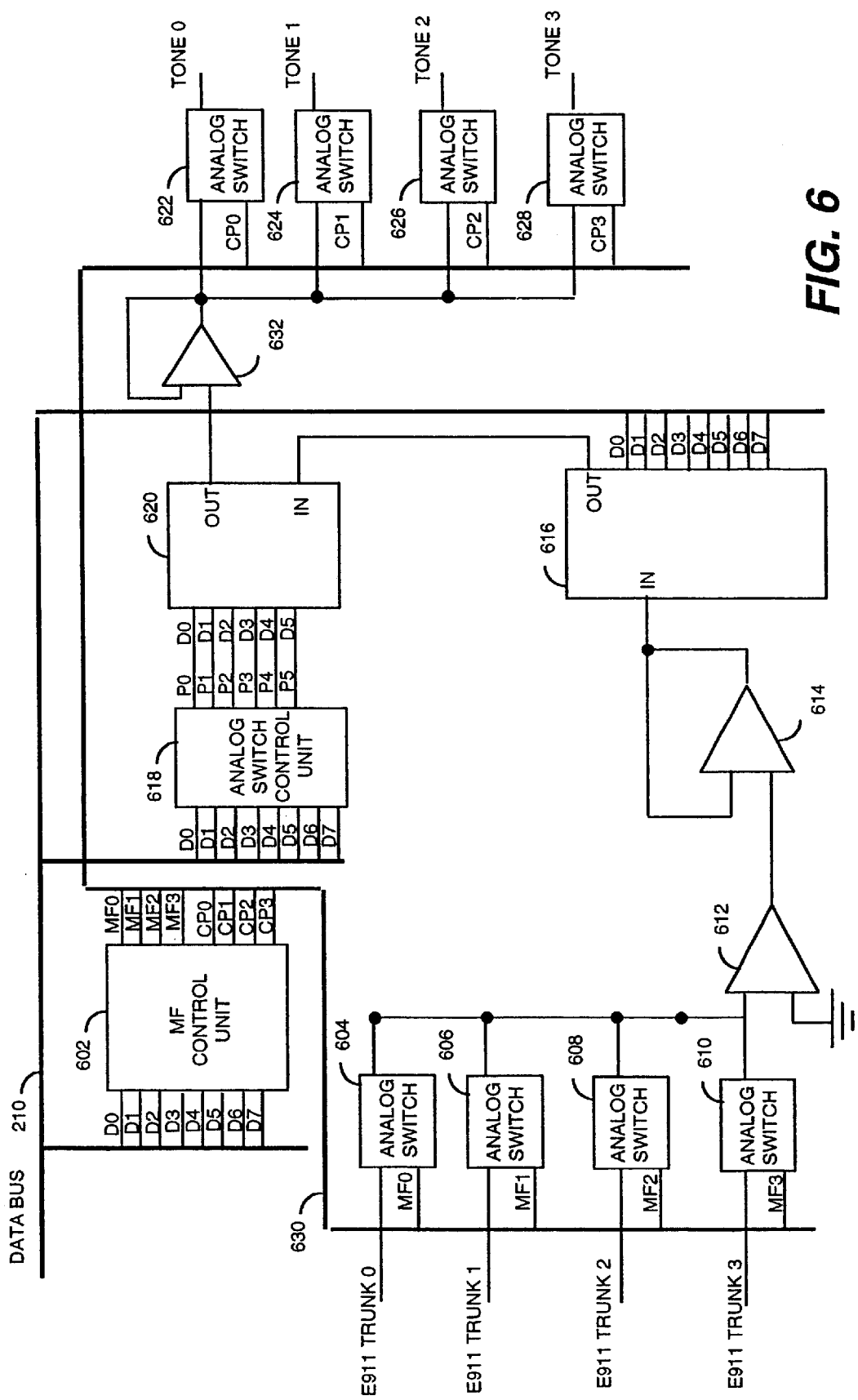
FIG. 6 is a block diagram of the multi-frequency decoder and tone generator circuit contained within the switching unit.

FIG. 6 is a general block diagram of the multi-frequency decoder circuit contained 324 in the switching unit 204. Each of the four E911 trunks (trunk0, trunk1, trunk2, and trunk3) operates as an input to an analog switch (604, 606, 608, and 610 ). The other input to each of the analog switches is a control signal (MF0, MF1, MF2, and MF3 ) that is generated by an MF control port 602 for the MF decoder circuit. The control signals MF0, MF1, MF2, and MF3 are the signal from the E911 trunk lines carried over the data bus 210. When one of the E911 trunks is a TTL high level and the corresponding control signal is also a TTL high level, the corresponding MF analog switch 604, 606, 609, 610 will close and cause the output of the analog circuit, which is the ANI information of the call to also be a TTL high level. For example, if trunk0 is a TTL high level and the corresponding control signal MF0 is also a TTL high level, then the output of the analog switch 604, which is ANI0 will also be a TTL high level.

The output of the analog switch 604, 606, 609, 610 is passed through an amplifier 612 and 614 and then passed to the input of the MF decoder 616. The MF decoder is preferably a model TSC 7BA207 integrated circuit manufactured by TDK Semiconductor Corporation of Tustin, Calif. The ANI information contained on the trunk lines is routed to the display unit as six bit data over the output data ports D0–D5 of the MF decoder 616. The high TTL level at the input port of the MF decoder 616 also causes the output port to be at a high TTL level. This in turn causes the input port of the tone generator 620 to be at a high TTL level. The tone generator is preferably a model M-991 integrated circuit manufactured by Teltone Corporation of Bothwell, Wash. The analog switch control unit 618 controls the output port of the tone generator 620.

The analog switch control unit 618 receives control signals over the data bus 210, which is connected to the input data ports D0–D7. The output ports P0–P5 of the analog switch control unit 618 are connected directly to the input ports D0–D5 of the tone generator 620. Therefore, when the input data ports of the control port are a TTL high level, the corresponding output port of the analog switch control unit 618 will also be a TTL high level, which will cause the input data ports of the tone generator 620 to be a TTL high level. The combination of the input data ports and the input port of the tone generator 620 will cause the output port of the tone generator 620 to be a TTL high level. The output signal of the tone generator 620 is then input to the operation amplifier 632, which amplifies the tone generator signal. The amplified tone generator signal is then input to each of the analog switches 622, 624, 626, and 628 that correspond to each of the trunk lines. A series of control signals CP0–CP3 generated by the MF control unit 602 control the operation of the analog switches. When one of the signals is a TTL high level, the analog switch is open and the amplified tone signal is transmitted on one of the corresponding TONE0–TONE3 outputs from the analog switches 622, 624, 626, and 628. The control signals CP0–CP3 operate independently of each other and the MF control unit 602 can set any or all of the control signals CP0–CP3 to TTL high level at any time. This allows the E911 backup system 102 to handle up to four E911 trunk lines simultaneously.

Figure 7A:
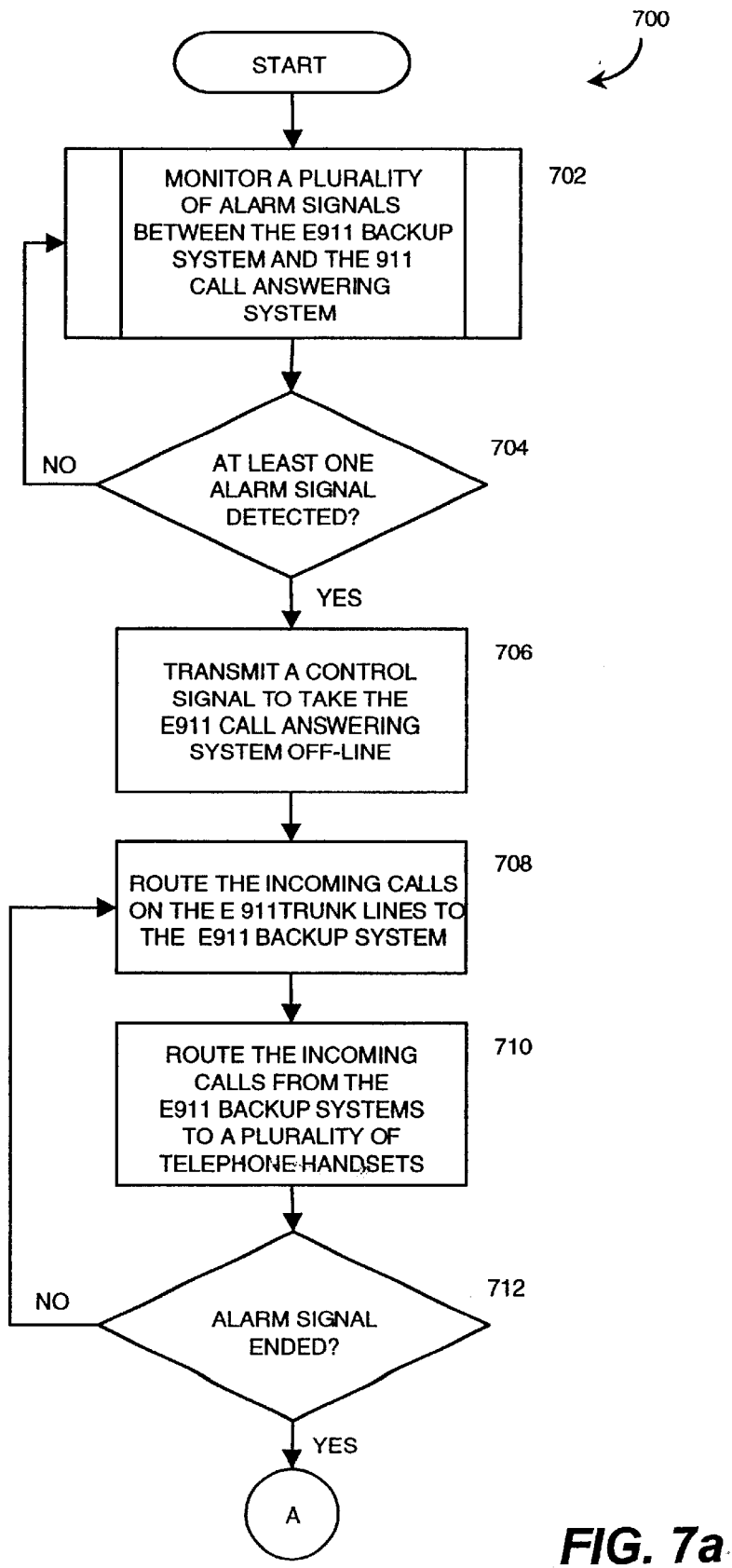
FIG. 7 is a logic flow diagram illustrating a routine for determining monitoring and backing up an E911 call answering system.
Figure 7B:
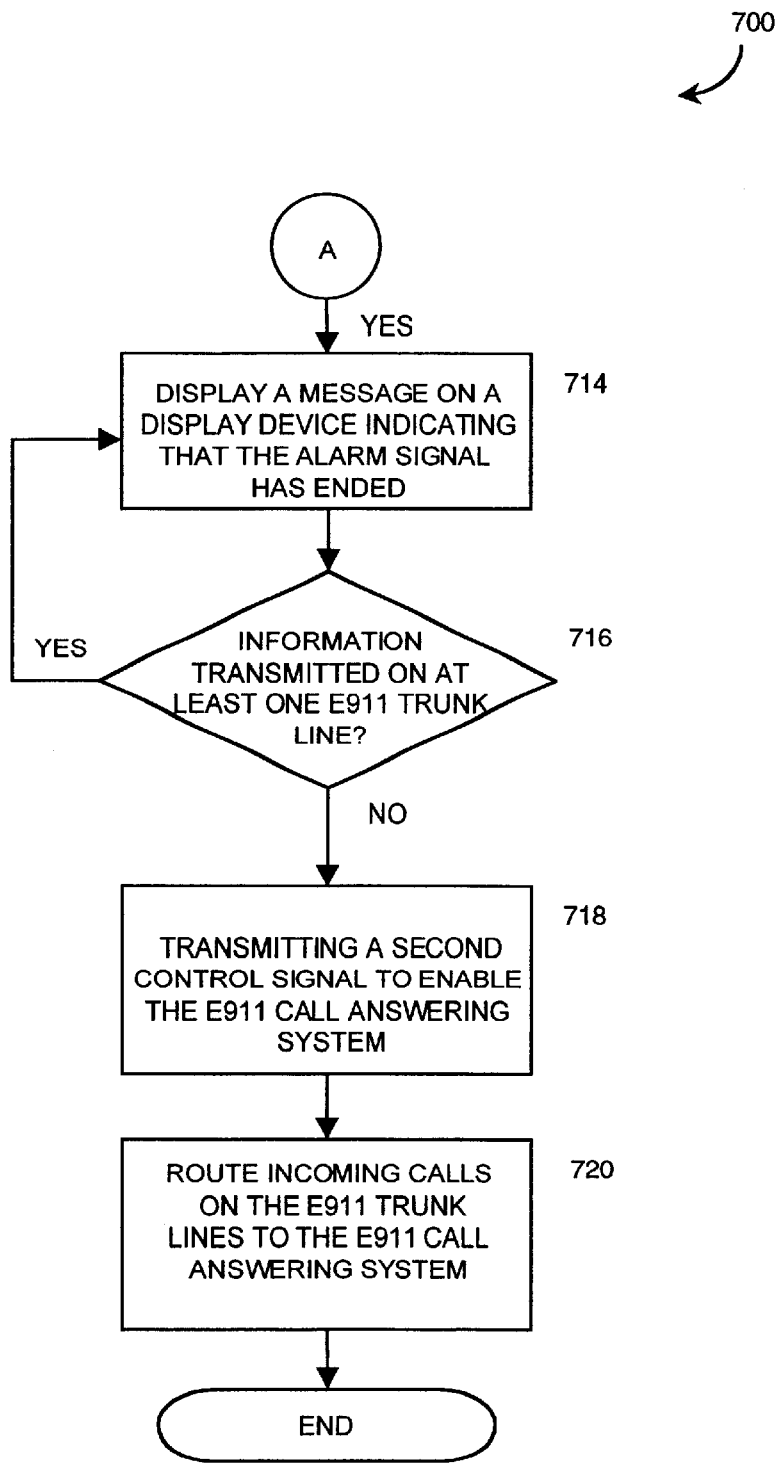

FIG. 7 is a logic flow diagram illustrating a routine 700 for monitoring and backing up an E911 call answering system 104. The routine is used in conjunction with the E911 backup system 102, which bridges the E911 trunks and is connected in parallel with the E911 call answering system. The Routine 700 begins at step 702 in which a number of alarm signals between the E911 backup system 102 and the E911 call answering system 104. The control unit 202 of the E911 backup system 102 monitors the signals. The alarm signals provide an indication to the E911 backup system that a problem has occurred with the E911 call answering system 104 and that the E911 backup system 102 should seize the E911 trunk lines 108.

Step 702 is followed by step 704, in which a determination is made whether the control unit 202 has detected at least one alarm signal. If none of the alarm signals have been detected, the "NO" branch is followed which loops back to step 702 to continue monitoring the alarm signals. Therefore, the E911 backup, the continually monitors the alarm signal while the E911 backup system 102 is active.

If the control unit, however, detects at least one of the alarm signals, the "YES" branch is followed to step 706. At step 706, the E911 backup system transmits a control signal that it has taken control of the E911 trunks 108 from the E911 system 104. Alternatively, the E911 backups system 102 may disable the E911 system 104 under certain circumstances or the E911 call answering system 104 off line. Step 706 is followed by step 708, in which the E911 backup system 102 routes the calls on the E911 trunks 108 to the E911 backup system. The E911 backup system 102 routes both incoming calls and any in progress calls to the E911 call answering system 104 to the backup system 102. The switching of the E911 trunk lines 108 must occur within a very short time of the E911 backup system detecting an alarm signal to ensure that any incoming calls are not disconnected. Because the E911 backup system 102 monitors the progress of all calls over the E911 trunks 108, the take over is fast enough to prevent any calls from being dropped. Typically, the takeover time is less than 125 milliseconds, which is adequate to ensure that any in-progress calls are not lost.

Step 708 is followed by step 710, in which the calls are routed to a number of standard telephone handsets. The switching unit 204 receives an incoming call over one of the E911 trunk and transfers the call to the next available handset. The switching unit 204 also generates a wink signal back to the originating equipment by causing a momentary reversal and re-reversal of the polarity of the voltage on the line. Because the E911 backup system 102 biases the line voltage at −48 volts, it must switch the voltage to +48 volts and back to a −48 volt. This signals the originating equipment that the call has been connected and also instructs the originating equipment to send the ANI, or caller ID information. Additionally, the switching unit 204 also generates a ring signal to transmit back to the originating equipment to provide an audible signal to the calling party that a connection has been established. The switching unit 202 also generates an audible tone signal that causes the handset to which the incoming call is routed, to produce a ring signal to alert the E911 operator.

Step 710 is followed by step 712, in which the control unit 202 makes the determination whether the alarm signal has ended, indicating that the E911 call answering system is back on-line. If the alarm signal has not ended, the routine branches back to step 708, in which the control unit 202 continues to transfer all incoming calls on the E911 trunks 108 to the E911 backup system 102. Therefore, in this manner, all incoming calls will be transferred to the E911 backup system 102 until the E911 call answering system 104 is up and running. Once the E911 call answering system is operating normally, the alarm signal will no longer be detected and the "YES" branch is followed to step 714 where a message is displayed on the display device 212 indicating that the alarm signal has ended, thereby providing the E911 operators with a visual cue that the E911 call answering system 104 is operational again.

Step 714 is followed by step 716, in which the determination is made whether a call is currently in progress to the E911 backup system 102 on at least one of the E911 trunk 108. If a call is still in progress while the alarm signal ends, the E911 backup system will not relinquish control of the four E911 trunks 108. This ensures that any in-progress calls being handled by the E911 backup system 102 will not be lost. This because the PSAP equipment is unable recover in-progress calls from the backup system. If a call is still in progress, routine 700 branches back to step 714, in which the display unit 212 continues to display a message indicating that the alarm signal has ended, indicating to the E911 operator that they may switch control back to the primary PSAP equipment once all four E911 trunk lines are idle. If no more calls are currently in-progress, the "NO" branch is followed to step 718, in which a control signal is transmitted to the E911 call answering system 104 to enable the primary PSAP equipment to resume control of the E911 trunks 108. Finally, step 718 is followed by step 720, in which the incoming calls on the E911 trunks 108 are routed to the E911 call answering system 104. Lastly, the step 720 is followed by the "END" step.

Figure 8:
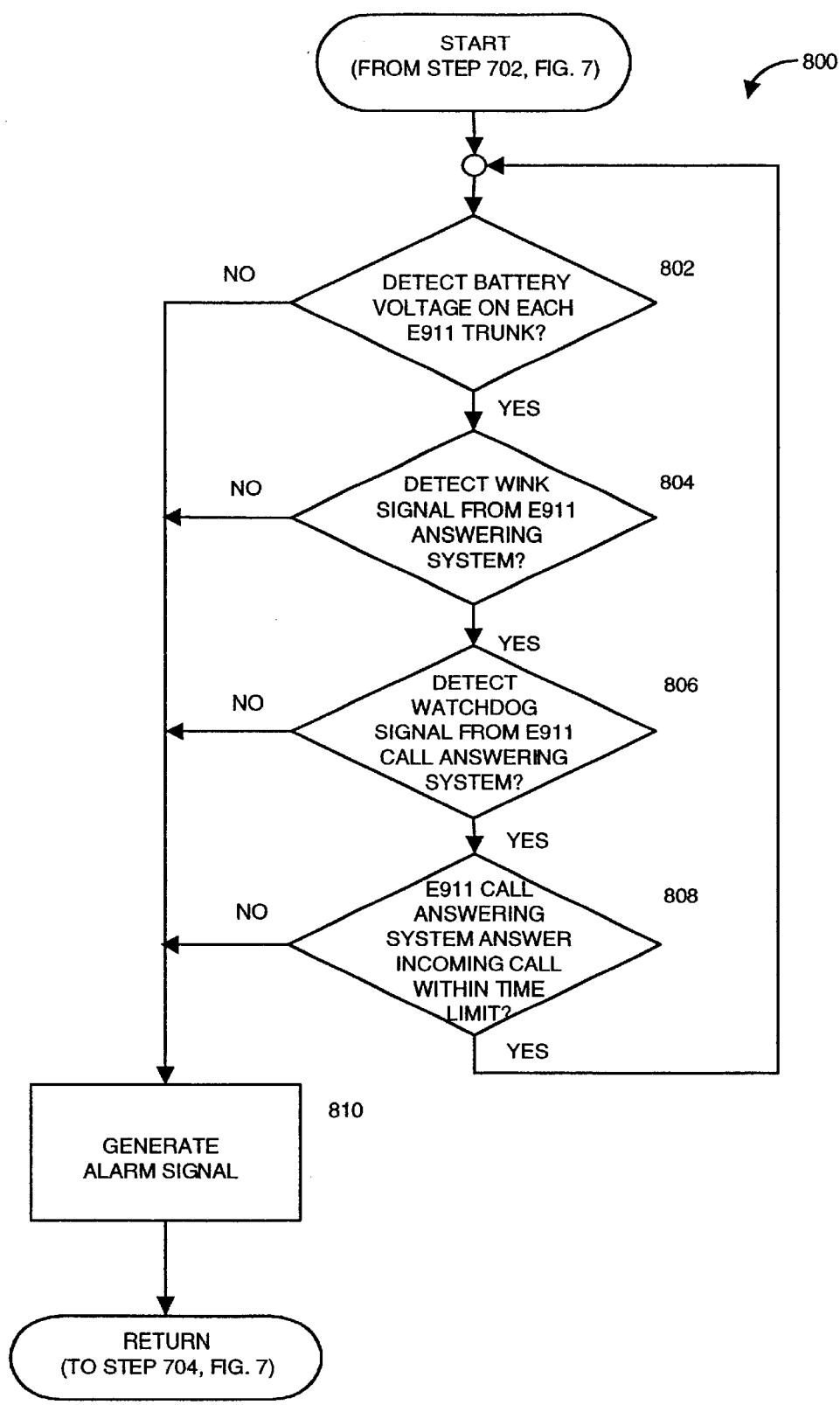
FIG. 8 is a logic flow diagram illustrating a routine for monitoring the alarm signals from an E911 call answering system.

FIG. 8 is a logic flow diagram of routine 800 for monitoring the alarm signals between the E911 backup system 102 and the primary PSAP equipment of the E911 call answering system 104. Routing 800 begins at step 802, in which the determination is made whether the control unit of the E911 backup system 102 detects a line voltage on each of the four E911 trunks 108. Because the primary PSAP equipment provides the line voltage for each E911 trunk 108, loss of line voltage on any of the trunks immediately indicates that the E911 call answering system 104 is malfunctioning. If the line voltage on at least one line is not detected, the "NO" branch is followed to step 810 where an alarm signal is generated. Step 810 is followed by the "RETURN" step, in which control is returned to step 712 of routine 700.

If a line voltage is detected on every E911 trunk 108, the "YES" branch is followed to step 804, in which the control unit 202 determines whether the E911 call answering system 104 generated a wink signal upon receipt of an incoming call on each of the E911 trunks. If the primary PSAP equipment fails to generate a wink signal for each incoming call, the "NO" branch is followed to step 810 where an alarm signal is generated. Step 810 is followed by the "RETURN" step, in which control is returned to step 712 of routine 700. If, however, the primary PSAP equipment generates a wink signal for every incoming call, the "YES" branch is followed to step 806.

At step 806, the control unit determines whether the watchdog signal from the E911 call answering system 104 is present. If the watchdog signal is not detected, then the "NO" branch is followed to the If the primary PSAP equipment fails to generate a wink signal for each incoming call, the "NO" branch is followed to step 810 where an alarm signal is generated. Step 810 is followed by the "RETURN" step, in which control is returned to step 712 of routine 700. However, if the watchdog signal is present, the primary PSAP equipment is operating properly and the "YES" branch is followed to step 808, where the last alarm signal is monitored.

At step 808, the E911 backup system 102 monitors the time the primary PSAP equipment takes to answer an incoming call. If the time to answer any given incoming call exceeds an pre-defined limit, the E911 backup system 102, interprets the primary PSAP equipment to be malfunctioning and seizes control of the E911 trunks 108. Typically, every call to the E911 call answering system should be answered within 16 seconds, which is long enough to allow four ring signals (standard time between ring cycles is 4 seconds). Although the pre-defined time limit for the primary PSAP equipment to answer an incoming call has been described to be 20 seconds, it should be obvious to those skilled in the art that the time limit for the primary PSAP equipment to answer an emergency call vary without deviating from the general scope of the invention.

If the primary PSAP equipment does not answer an incoming call within the allowed pre-defined time limit, the "NO" branch is followed to step 810 where an alarm signal is generated. Step 810 is followed by the "RETURN" step, in which control is returned to step 712 of routine 700. If, however, each call is answered within the pre-defined time limit, routine 800 branches back to step 802 to begin the alarm signal monitoring process anew.

The present invention thus provides a system to detect the possible failure of a computer-operated E911 call answering system and keep emergency 911 calls from being dropped during a failure of the underlying computer system of the emergency 911 call answering system.

It should be understood that the foregoing pertains only to the preferred embodiments of the present invention, and that numerous changes may be made to the embodiments described herein without departing from the spirit and scope of the invention.

What is claimed is:

1. An apparatus for providing a back-up service for an E911 call answering system, wherein the E911 call answering system comprises a plurality of E911 trunk lines operable for carrying a plurality of incoming telephone calls, comprising:

a control unit operative for monitoring a plurality alarm signals generated by the 911 system;

a switching circuit operative for routing the incoming telephone calls carried by the plurality of 911 trunk lines to a plurality of telephones when the switching unit detects at least one of the plurality of alarm signals;

an input port operative for receiving the incoming telephone calls carried is by the plurality of trunk lines, the alarm signals generated by the E911 backup system, and a power signal;

an output port connected to the switching circuit plurality operative for transmitting the telephonic data from the trunk lines to at least one of a plurality of telephone handsets; and a data bus operable for carrying information between the control unit, the switching unit and the display circuit.

2. The apparatus of claim 1 further comprising:

a display circuit operative for displaying information regarding the status of switching circuit;

a serial port connected to the data bus operative for transmitting and receiving a plurality of control data;

a printer port operative for transmitting a plurality of status information to a printer; and a power supply operative for receiving an input voltage and supplying a plurality of output voltages.

3. The apparatus of claim 2, wherein the control unit comprises:
- a central processing unit;
- a first memory storage device connected to the central processing unit operative for storing an initialization computer program;
- a second memory storage device connected to the central processing unit operative for storing a computer application program comprising a plurality of subprograms; and
- a third memory storage device operative for storing the information associated with the incoming telephone calls.

4. The apparatus of claim 3, wherein the first memory storage device is an erasable programmable read-only memory.

5. The apparatus of claim 3, wherein the initialization computer code is loaded into the central processing unit from the first memory storage device when power is applied to the E911 backup system.

6. The apparatus of claim 5, wherein the initialization computer code comprises computer-readable instructions for performing a set of diagnostic tests on the control unit, the switching unit and on the display circuit.

7. The apparatus of claim 6, wherein the initialization computer code further comprises computer-readable instructions for downloading the computer application program stored in the second memory.

8. The apparatus of claim 3, wherein the second memory storage device comprises a random access memory.

9. The apparatus of claim 3, wherein the computer application program comprises a plurality of operating modes.

10. The apparatus of claim 9, wherein the control unit further comprises a switching circuit operative for enabling at least one of the plurality of operating modes contained in the computer application program.

11. The apparatus of claim 2, wherein the display circuit comprises:
- a first display operative for displaying a plurality of alphanumeric messages generated by the control unit; and
- a second display comprising;
  - a first group of lights operative to indicate the polarity of each trunk line connected to the input port, and
  - a second group of light operative to indicate whether the E911 backup system is turned on.

12. The apparatus of claim 9, wherein the plurality of operating modes comprise a diagnostics mode, a random access memory update/backup disable mode, a take over on battery loss mode, take over on no wink/no answer mode, a take over on watchdog signal mode, a no function mode, an unconditional take-over mode, and a 20 digit ANI display mode.

13. The apparatus of claim 2, wherein the switching unit comprises:
- a plurality of 911 interface circuits, wherein each 911-interface circuit is associated with at least one of the 911 trunk lines and is operative for monitoring the plurality of incoming telephone calls from the plurality of 911 trunk lines;
- a plurality of plain old telephone interfaces, wherein each plain old telephone interface is associated with at least one of the telephone handsets and is operative to transmit the incoming telephone calls to at least one telephone handset; and
- a plurality of opto-isolators, wherein each opto-isolator is associated with at least one of the trunk lines and is operative to monitor a wink signal generated by each trunk line and generate at least one alarm signal if at least one wink signal is not detected.

14. The apparatus of claim 13, wherein at least one of the alarm signals is a watchdog signal.

15. The apparatus of claim 13, wherein at least one of the alarm signal is an absence of a voltage on at least one of the trunk lines.

16. The apparatus of claim 13, wherein at least one of the alarm signals is a watchdog signal.

17. An apparatus for backing up an E911 call answering system, wherein the E911 call answering system comprises a plurality of E911 trunk lines operable for carrying a plurality of incoming telephone calls, comprising:
- a control unit operative for monitoring a plurality alarm signals generated by the E911 call answering system;
- a switching circuit operative for routing the incoming telephone calls carried by the plurality of E911 trunk lines to a plurality of telephones when the switching unit detects at least one of the plurality of alarm signals;
- an input port operative for receiving the incoming telephone calls carried by the plurality of E911 trunk lines, the alarm signals generated by the E911 backup system, and a power signal;
- an output port connected to the switching circuit operative for transmitting the telephonic data from the trunk lines to at least one of a plurality of telephone handsets;
- a data bus operable for carrying information between the control unit, the switching unit and the display circuit;
- a display unit operative for displaying information regarding the status of switching circuit;
- a serial port connected to the data bus operative for transmitting and receiving a plurality of control data;
- a printer port operative for transmitting a plurality of status information to a printer; and
- a power supply operative for receiving an input voltage and supplying a plurality of output voltages.

18. The apparatus of claim 17, wherein at least one of the plurality of alarm signals comprise a watchdog signal from the E911 call answering system.

19. The apparatus of claim 17, wherein at least one of the plurality of alarm signals comprise a no battery on the E911 trunk signal.

20. The apparatus of claim 17, wherein at least one of the plurality of alarm signals comprises a wink watch signal.

21. The apparatus of claim 17, wherein at least one of the plurality of alarm signals comprises a no answer signal.

22. The apparatus of claim 17, wherein the information carried by the E911 trunk lines comprises an automatic number identification.

23. The apparatus of claim 17, wherein the control unit comprises:
- a central processing unit;
- an erasable programmable read-only memory storage device connected to the central processing unit operative for storing an initialization computer program;
- a flash random access memory storage device connected to the central processing unit operative for storing a computer application program comprising a plurality of subprograms; and
- a random access memory storage device operative for storing information associated with the incoming telephone calls.

24. The apparatus of claim 17, wherein the switching unit comprises:
- a plurality of 911 interface circuits, wherein each 911-interface circuit is associated with at least one of the 911 trunk lines and is operative for monitoring the plurality of incoming telephone calls from the plurality of 911 trunk lines;
- a plurality of plain old telephone interfaces, wherein each plain old telephone interface is associated with at least one of the telephone handsets and is operative to transmit the incoming telephone calls to at least one telephone handset; and
- a plurality of opto-isolators, wherein each opto-isolator is associated with at least one of the E911 trunk lines and is operative to monitor a wink signal generated by each trunk line and generate at least one alarm signal if at least one wink signal is not detected.

25. A method of backing up a 911 call answering system using E911 backup system connected to the 911 call answering system in parallel across a plurality of trunk lines connected to the 911 call answering system, comprising the steps of:
- monitoring a plurality of alarm signals between the E911 backup system band the 911 call answering system;
- detecting at least one of the plurality of alarm signals;
- transmitting a control signal from the E911 backup system to the 911 call answering system, the control signal operative to disable the 911 call answering system in response to detecting at least one of the plurality of alarm signals;
- routing the incoming telephone calls on at least one of the trunk lines to the E911 backup system; and
- routing the incoming telephone calls from the E911 backup system to a plurality of telephone handsets.

26. The method of claim 25, further comprising:
- monitoring the plurality of trunk lines to determine whether the alarm signal has ended;
- displaying a message on a display device to indicate that the alarm signal has ended in response to determining that the alarm signal has ended;
- monitoring the plurality of trunk lines to determine whether information is being transmitted on at least one of the trunk lines from a control office; and
- transmitting a second control signal to the 911 call answering system to enable the 911 call answering system to receive the plurality of information transmitted on the plurality of trunk lines in response to determining that no information is transmitted on any one of the trunk lines.

27. The method of claim 26, wherein at least one alarm signal is a watchdog signal.

28. The method of claim 26, wherein at least one of the alarm signal is generated by the absence of a voltage on at least one of the trunk lines.

29. The method of claim 26, wherein at least one of the alarm signals is generated by the absence of a wink signal.

30. The method of claim 26, wherein at least one of the alarm signals is a watchdog signal.

* * * * *